United States Patent
Silberling et al.

(10) Patent No.: US 12,044,599 B2
(45) Date of Patent: Jul. 23, 2024

(54) WHEEL SYSTEM FOR USE WITH A GUIDE SOFT TARGET

(71) Applicant: Dynamic Research, Inc., Torrance, CA (US)

(72) Inventors: Jordan Y. Silberling, Redondo Beach, CA (US); Joseph Kelly, Lakewood, CA (US); John Lenkeit, San Pedro, CA (US); Nathan Watanabe, Northridge, CA (US); Kyle Nagao, Torrance, CA (US)

(73) Assignee: Dynamic Research, Inc., Torrance, CA (US)

( * ) Notice: Subject to any disclaimer, the term of this patent is extended or adjusted under 35 U.S.C. 154(b) by 0 days.

(21) Appl. No.: 18/277,055

(22) PCT Filed: Nov. 15, 2022

(86) PCT No.: PCT/US2022/049943
§ 371 (c)(1),
(2) Date: Aug. 11, 2023

(87) PCT Pub. No.: WO2023/091401
PCT Pub. Date: May 25, 2023

(65) Prior Publication Data
US 2024/0044746 A1     Feb. 8, 2024

Related U.S. Application Data

(60) Provisional application No. 63/349,680, filed on Jun. 7, 2022, provisional application No. 63/281,548, filed on Nov. 19, 2021.

(51) Int. Cl.
*G01M 17/007*     (2006.01)

(52) U.S. Cl.
CPC ................ *G01M 17/007* (2013.01)

(58) Field of Classification Search
CPC .................................................. G01M 17/007
See application file for complete search history.

(56) References Cited

U.S. PATENT DOCUMENTS 3,733,894 A  *  5/1973  Dahl ................. G01M 17/0076
                                                     73/116.09
3,940,978 A  *  3/1976  Akkerman ............... G01L 3/242
                                                     73/116.09

(Continued)

FOREIGN PATENT DOCUMENTS

CN          112747940          5/2021

OTHER PUBLICATIONS

AB Dynamics. LaunchPad—ADAS testing for Vulnerable Road Users. YouTube. 01 Jun. 24, 2018. [retrieved on Jan. 31, 2023]Retrieved from internet:<https://www.youtube.com/watch?v=x7-SS1LxjPw>. entire video.

*Primary Examiner* — Eric S. McCall
(74) *Attorney, Agent, or Firm* — Manuel de la Cerra

(57) ABSTRACT

A wheel system adapted for use with a guided soft target (GST) is disclosed. The GST includes a soft body that is removably attachable to a dynamic motion element (DME). The wheel system has an axle connected to the soft body and to a tire body rotatably connected to the axle. The tire body has an outer surface concentric with the axle and encircling the axle with a ground-contacting tire ridge extending from and encircling the outer surface. The ridge is constructed to contact the ground when the soft body is attached to a DME. The ridge is comprised of a ridge material and has a ridge width, both of which are selected to (1) permit the tire body to slide in a direction parallel to the axle when the tire body is subjected to a lateral force; and to (2) rotate the tire body as the DME moves.

19 Claims, 12 Drawing Sheets

(56) References Cited

U.S. PATENT DOCUMENTS

| | | | | |
|---|---|---|---|---|
| 5,018,977 | A | * | 5/1991 | Wiley .............. G01M 17/0078 |
| | | | | 434/262 |
| 5,364,271 | A | * | 11/1994 | Aknin .................... A63B 22/16 |
| | | | | 434/61 |
| 9,182,942 | B2 | | 11/2015 | Kelly et al. |
| 10,830,670 | B2 | | 11/2020 | Simader et al. |
| 2005/0175968 | A1 | * | 8/2005 | Milner ................... G09B 9/058 |
| | | | | 434/61 |
| 2013/0018526 | A1 | * | 1/2013 | Kelly ............... G01M 17/0078 |
| | | | | 701/2 |
| 2018/0010984 | A1 | * | 1/2018 | Silberling ................ G06G 7/78 |
| 2018/0154961 | A1 | * | 6/2018 | Woods ................... B62D 61/12 |
| 2019/0257717 | A1 | * | 8/2019 | Hafellner .......... G01M 17/0078 |
| 2019/0337385 | A1 | * | 11/2019 | Lim .................... B60K 23/0808 |
| 2020/0217754 | A1 | * | 7/2020 | Janevik .................. G09B 9/048 |
| 2020/0298931 | A1 | * | 9/2020 | Okoshi ................ B60T 8/3225 |
| 2021/0031680 | A1 | | 2/2021 | Amacker |
| 2021/0255064 | A1 | * | 8/2021 | Sones ............... G01M 17/0078 |
| 2022/0185264 | A1 | * | 6/2022 | Wirthl ............... G01M 17/0078 |
| 2023/0043410 | A1 | * | 2/2023 | Zhang ..................... B60K 1/02 |
| 2023/0266202 | A1 | * | 8/2023 | Ruhs ...................... B60L 15/20 |
| | | | | 701/301 |

* cited by examiner

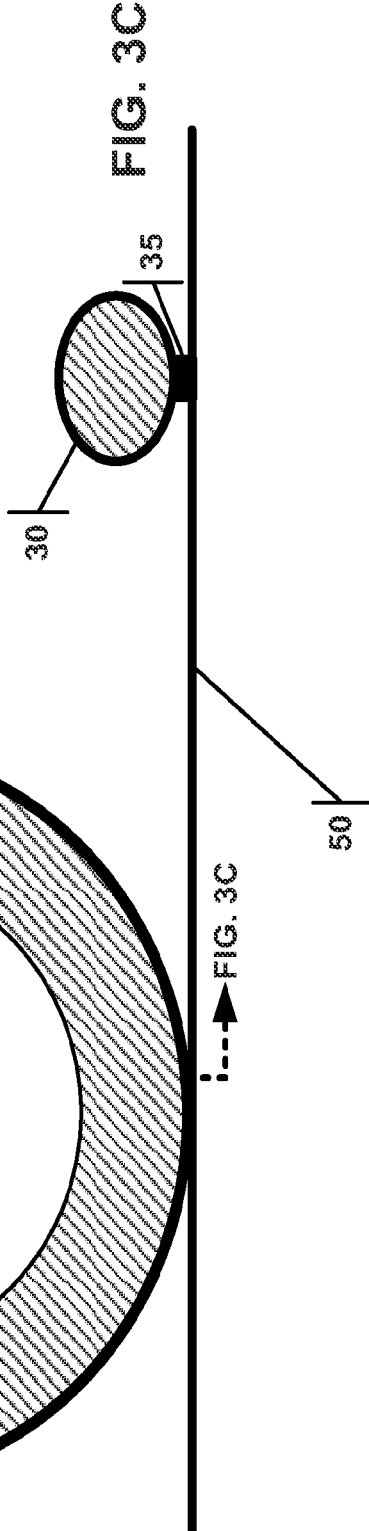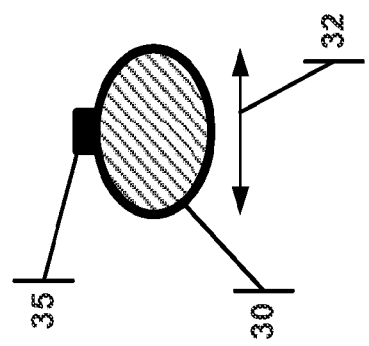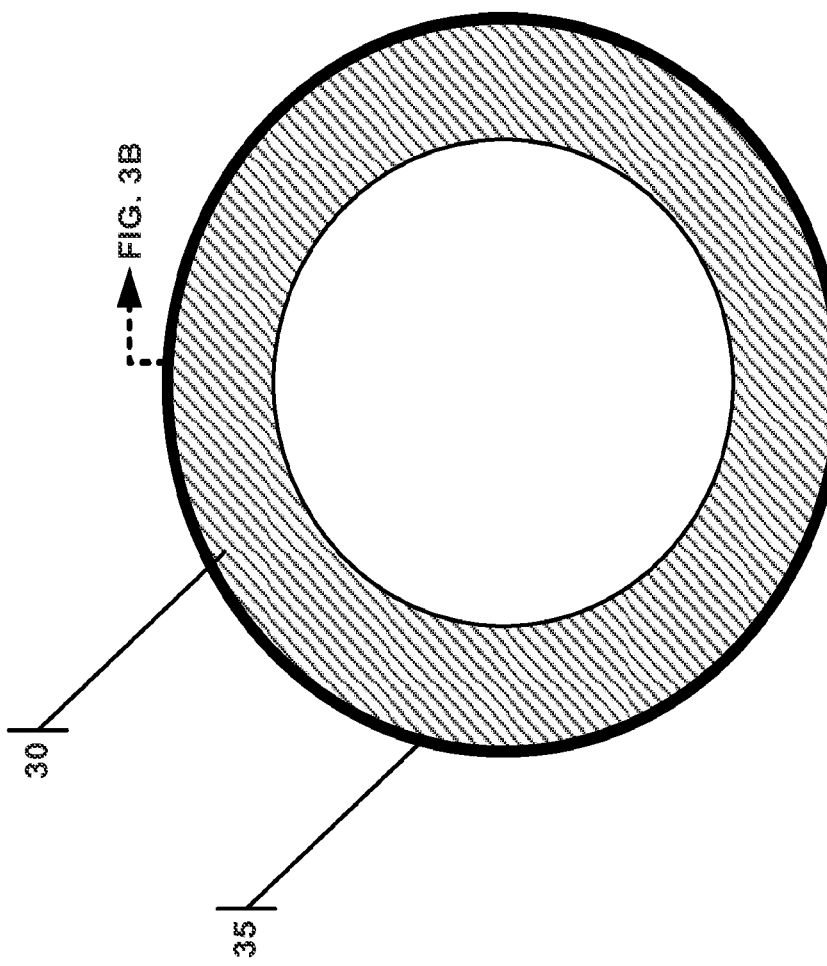

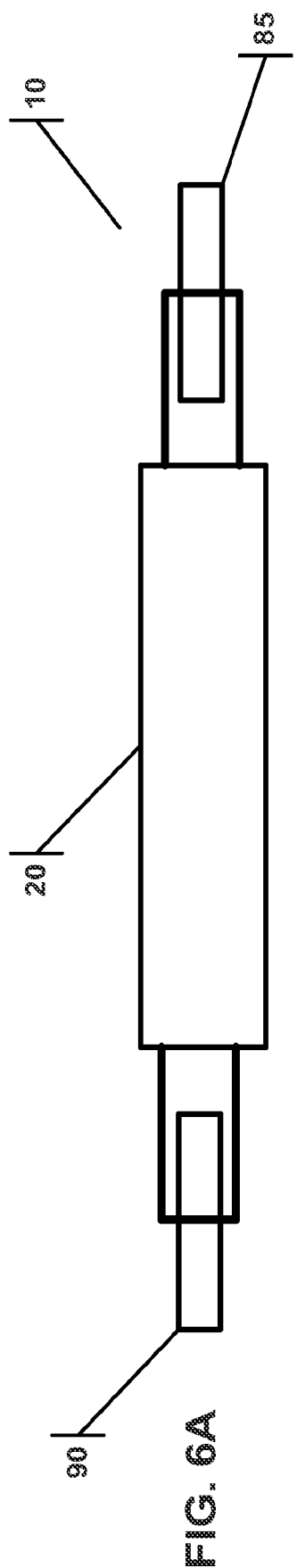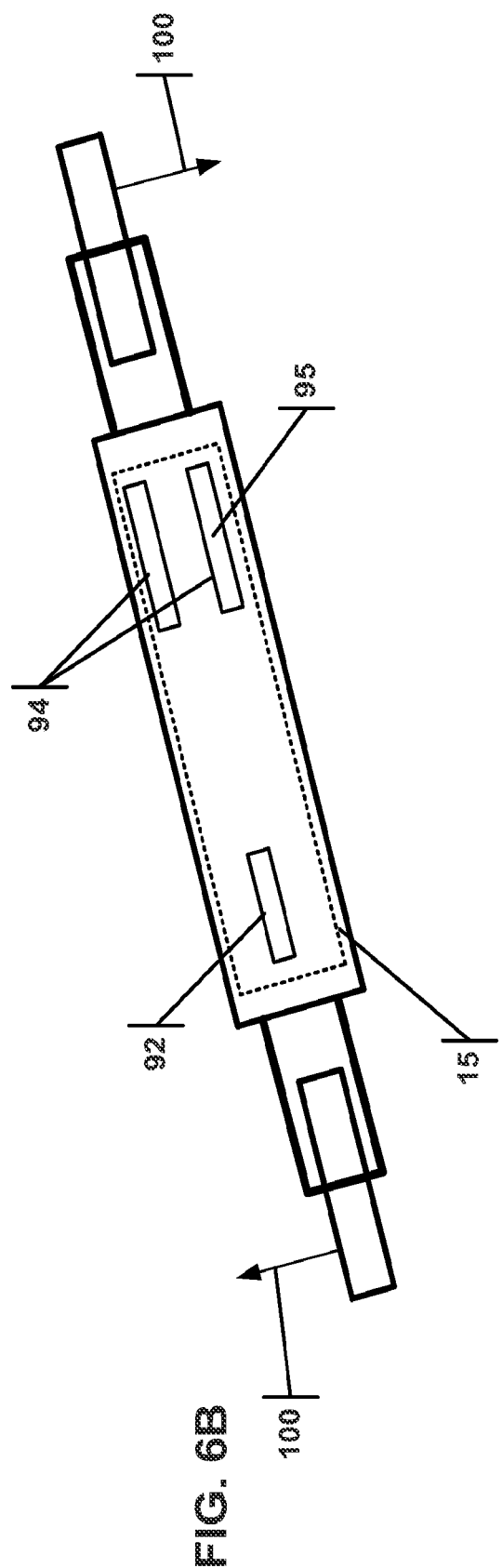
FIG. 6A
FIG. 6B

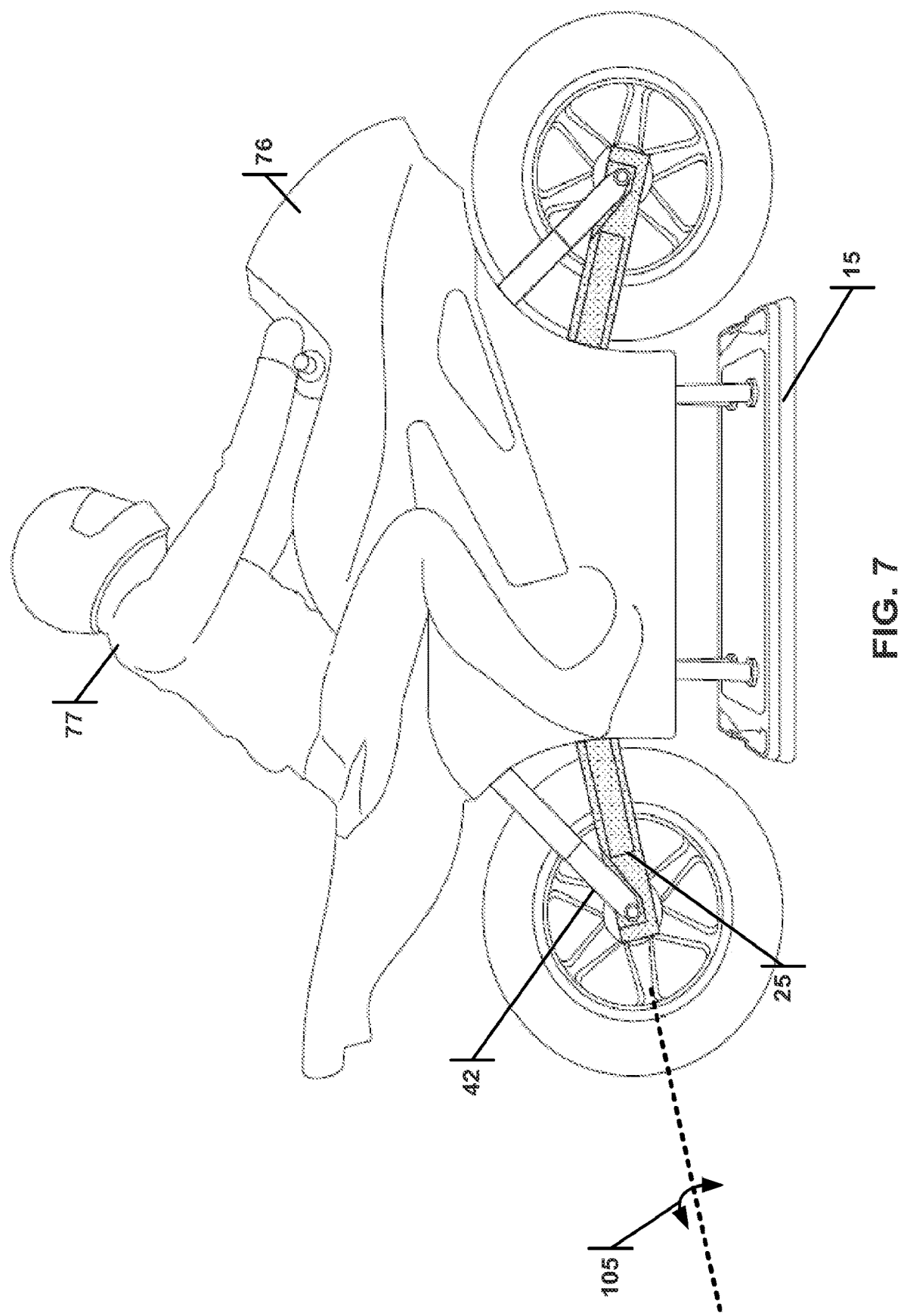

WHEEL SYSTEM FOR USE WITH A GUIDE SOFT TARGET

1.0 RELATED APPLICATIONS

The present application is the Section 371 national filing of PCT application PCT/US22/49943 entitled "System And Method For Testing Crash Avoidance Technologies" and filed on Nov. 15, 2022, which in turn claims priority to U.S. Provisional Application No. 63/281,548 entitled "System And Method For Testing Crash Avoidance Technologies" and filed on Nov. 19, 2021, and to U.S. Provisional Application No. 63/349,680 entitled "System And Method For Testing Crash Avoidance Technologies" and filed on Jun. 7, 2022. All of these applications are hereby incorporated in their entireties including all tables, figures and claims.

2.0 TECHNICAL FIELD

The present invention relates to devices, systems, and methods for testing crash avoidance technologies.

3.0 BACKGROUND

The system disclosed herein can be used with, but is not limited to, vehicles employed in crash avoidance technologies disclosed in the following patents and patent applications developed by the same inventors and assigned to the same assignee: U.S. Pat. No. 8,428,863 issued on Apr. 23, 2013 and titled "Devices, System, and Methods for Testing Crash Avoidance Technologies"; U.S. Pat. No. 8,428,864 issued on Apr. 23, 2013 and titled "Devices, System, and Methods for Testing Crash Avoidance Technologies"; U.S. Pat. No. 8,447,509 issued on May 21, 2013 and titled "System and Method for Testing Crash Avoidance Technologies"; U.S. Pat. No. 8,457,877 issued on Jun. 4, 2013 and titled "Devices, System, and Methods for Testing Crash Avoidance Technologies"; U.S. Pat. No. 8,583,358 issued on Nov. 12, 2013 and titled "Devices, System, and Methods for Testing Crash Avoidance Technologies"; U.S. Pat. No. 8,589,062 issued on Nov. 19, 2013 and titled "Devices, System, and Methods for Testing Crash Avoidance Technologies"; U.S. Pat. No. 8,751,143 issued on Jun. 10, 2014 and titled "System and Method for Testing Crash Avoidance Technologies"; U.S. Pat. No. 8,755,999 issued on Jun. 17, 2014 and titled "System and Method for Testing Crash Avoidance Technologies"; U.S. Pat. No. 8,762,044 issued on Jun. 24, 2014 and titled "System and Method for Testing Crash Avoidance Technologies"; U.S. Pat. No. 9,182,942 issued on Nov. 10, 2015 and titled "System and Method for Testing Crash Avoidance Technologies"; U.S. Pat. No. 9,827,998 issued on Nov. 28, 2017 and titled "System and Method for Testing Crash Avoidance Technologies"; U.S. patent Ser. No. 10/585,429 issued on Mar. 10, 2020 and titled "Robotic Steering Controller for Optimal Free Response Evaluation"; U.S. patent Ser. No. 10/697,856 issued Jun. 30, 2020 and titled "A Soft Collision Partner (AKA Soft Car) Used in System For Testing Crash Avoidance Technologies"; PCT Application No. PCT/US22/45956 filed on Oct. 6, 2022 and titled "Articulating Pedestrian Dummy for Vehicle Testing"; PCT Application No. PCT/US22/46246 filed on Oct. 11, 2022 and titled "Wirelessly Controlled Lights for Surrogate Targets"; U.S. Provisional Application 63/281,548 filed on Nov. 19, 2021 and titled "System and Method for Testing Crash Avoidance Technologies"; and U.S. Provisional Application 63/349,680 filed on Jun. 7, 2022 and titled "System and Method for Testing Crash Avoidance Technologies". Each of these patents and patent applications is incorporated herein in their entirety including all tables, figures, and claims.

As Advanced Crash Avoidance Technologies (ACATs) such as Forward Collision Warning (FCW), Crash Imminent Braking Systems and other advanced technologies continue to be developed, the need for full-scale test methodologies that can minimize hazards to test personnel and damage to the equipment used during testing has rapidly increased. Evaluating such ACAT systems presents many challenges. For example, the evaluation system should be able to deliver a potential Soft Collision Partner (Soft CP) reliably and precisely along a trajectory that would ultimately result in a crash in a variety of configurations, such as rear-end collisions, head-on collisions, crossing path collisions, and side-swipe collisions. Additionally, the Soft Collision Partner should not pose a substantial physical risk to the test driver, other test personnel, equipment, or to the subject vehicles in the event that the collision is not avoided. This challenge has been difficult to address. Thirdly, the Soft CP should appear to the subject vehicle as the actual item being simulated, such as a motor vehicle, a pedestrian, or other object. For example, the Soft CP should provide a consistent signature for radar, cameras, and other sensors to the various subject vehicles, substantially identical to that of the item being simulated. It would be also be advantageous for the Soft CP to be inexpensive and repeatably reusable with a minimum of time and effort.

As disclosed in the inventors' previous patent applications, fully incorporated herein by reference, the Guided Soft Target (GST) system includes a dynamic motion element (DME) as a mobile and controllable platform that carries the Soft CP. The DME is of such shape and dimension that it can be run over by the vehicle under test (aka the subject vehicle), with little to no damage to either the DME or to the subject vehicle. When a collision occurs with the GST system, the subject vehicle impacts the Soft CP, which then absorbs the collision and may collapse and/or separate from the DME. Such a Soft CP is disclosed in U.S. patent application Ser. No. 13/532,366 (issued as U.S. Pat. No. 8,428,863), incorporated herein by reference. It is also disclosed fully in the previous patent applications listed above and incorporated by reference.

The innovations disclosed herein are directed to a Soft CP with soft wheels that rotate at a speed that corresponds to the speed of the DME. The rotation of the Soft CP wheels is therefore realistic, improving the ability to fully evaluate the ACAT on a test vehicle.

4.0 SUMMARY

The present invention provides an elegant solution to the needs described above and offers numerous additional benefits and advantages, as will be apparent to persons of skill in the art. Disclosed herein is a wheel system adapted for used with a guided soft target (GST). The GST includes a soft body that is removably attachable to a dynamic motion element (DME). The wheel system has an axle connected to the soft body and a tire body rotatably connected to the axle. The tire body has an outer surface concentric with the axle and encircling the axle with a ground-contacting tire ridge extending from and encircling the outer surface. The ridge is constructed to contact the ground when the soft body is attached to a DME. The ridge is comprised of a ridge material and has a ridge width, both of which are selected to (1) permit the tire body to slide in a direction parallel to the axle when the tire body is subjected to a lateral force without causing inclination about the longitudinal axis; and to (2) rotate the tire body as the DME moves.

The tire body may have a width that is at least four times large than the ridge width. The ridge may extend from the outer surface in the range of ⅛ inch to 2 inches, and may be comprised of a material that is different than the tire body material. For example, the tire body material may be ethylene-vinyl acetate copolymer foam, and the ridge material may be ethylene propylene diene monomer rubber.

The system may also include a fork extending from the soft body, and the axle is connected to the fork. A strap or cable may be connected to the fork on one end and to the soft body on the other end. The strap or cable comprises a tension force that counteracts a portion of the gravitational force experienced by the tire body when the soft body is attached to a DME. The strap or cable may be constructed to mitigate bouncing of the wheel and minimize lateral forces on the wheel when the DME moves.

The soft body may be a soft car, a soft motorcycle, or a soft bicycle.

A soft body adapted to form the body of a Guided Soft Target for testing crash avoidance technologies in a subject vehicle is also disclosed. The soft body is adapted to be mounted atop a DME and when so mounted is adapted to collide with the subject vehicle while the DME is moving. The soft body includes (1) a body comprised of closed-cell Ethylene-Vinyl Acetate (EVA) copolymer foam with a durometer of between 50 and 90 Shore A and an abrasion resistance index greater than 20; and (2) a mounting surface formed into the body, the mounting surface constructed to detachably mount the soft body to the DME.

The soft body may approximate the three-dimensional shape and size of a vehicle, wherein the three-dimensional shape may be a car, motorcycle, or bicycle. The soft body may approximate the three-dimensional shape and size of a pedestrian. The soft body may be at least partially covered in protective fabric.

The soft body may also include a wheel system with an axle connected to the body positioned substantially perpendicular to a body longitudinal axis. A tire body may be rotatably connected to the axle. The tire body is constructed to (1) contact the ground when the body is mounted to a DME, and to (2) rotate about the axle as the DME moves.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

5.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 3A is a diagram of the ground-contacting tire ridge and tire body, with two cross sections delineated.

FIG. 3B is the cross section taken along the top cross section of FIG. 3A.

FIG. 3C is the cross section taken along the bottom cross section of FIG. 3A.

FIG. 6A illustrates a top view of a soft motorcycle target driving in a straight line.

FIG. 6B illustrates the turning point axis of a soft motorcycle target, along with the lateral friction forces against the wheels of the soft motorcycle target.

FIG. 7 illustrates a Soft Motorcycle Target, complete with a motorcycle shell and rider.

6.0 DETAILED DESCRIPTION

Figure 1:
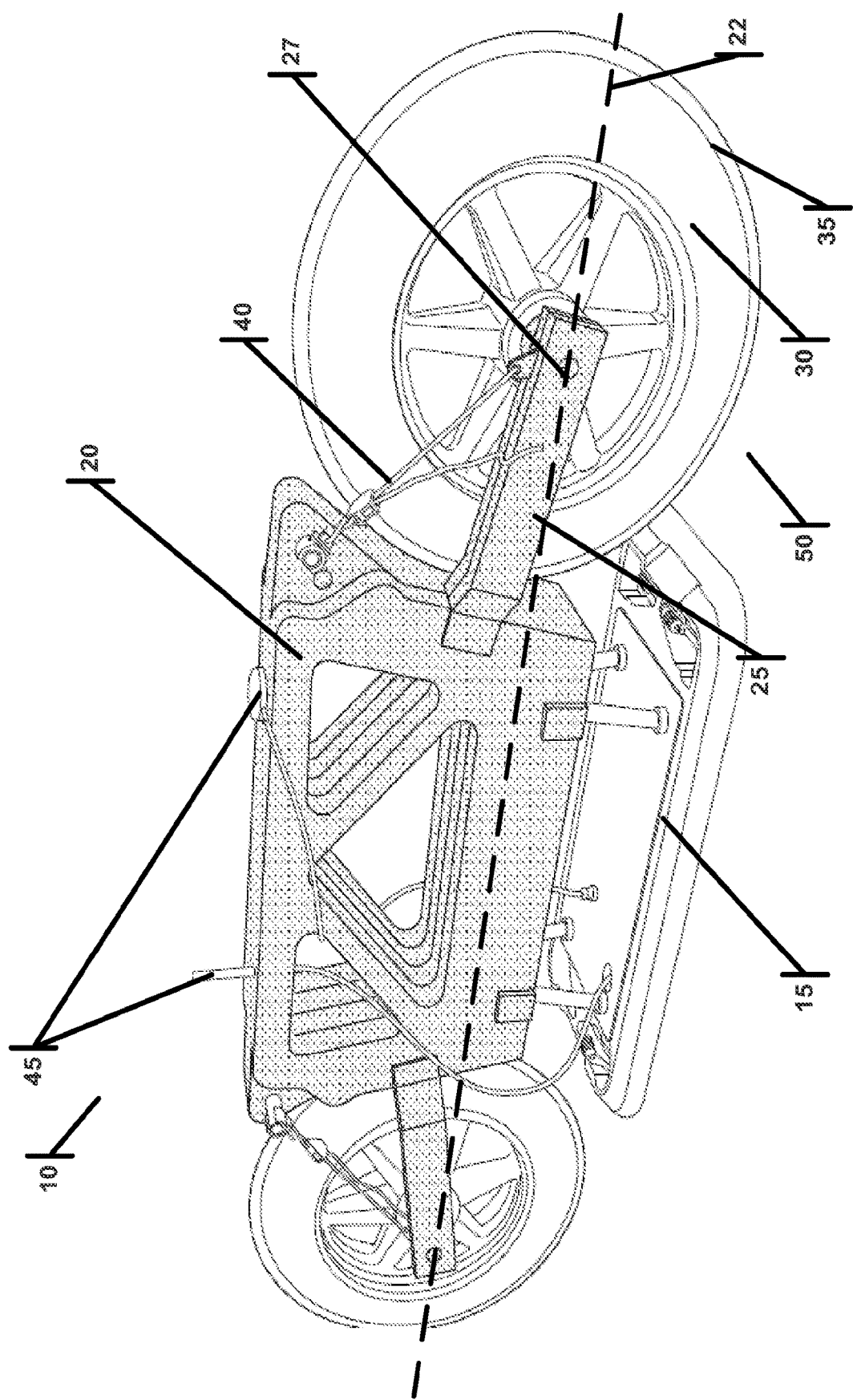
FIG. 1 is a photograph of a Soft Motorcycle Target without the motorcycle shell and rider.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with the attached figures and is provided for ease of reference, where like reference numerals designate corresponding features throughout the specification and figures:

GST with Soft Motorcycle CP 10
GST with Soft Car CP 10A
Dynamic Motion Element 15
Soft Frame 20
Soft Frame Longitudinal Axis 22
Soft Wheel Mounting Forks 25
Axle 27
Tire Body 30
Ground-contacting Tire Ridge 35
Tension Cable 40
Tension Ribbon 42
Antennae 45
Ground 50
Conventional Motorcycle 60
Conventional Car 60A
Rear Wheel 65
Rear Wheels 65A
Front Wheel 70
Front Wheels 70A
Motorcycle Frame 75
Motorcycle Shell 76
Motorcycle Rider 77
Protective Fabric Cover 78
Motorcycle Turning Pivot Axis 80
Automobile Turning Pivot Axis 80A
Soft Motorcycle CP Rear Wheel 85
Soft Motorcycle CP Front Wheel 90
DME Steering Wheel 92
DME Drive Wheels 94
Soft Motorcycle CP Turning Pivot Axis 95
Soft Car CP Turning Pivot Axis 95A
Lateral Friction Force Against Wheels 100
Torsional Force 105

In order to provide a Soft CP with realistic wheel rotation, the wheels of the Soft CP may have an independent motorized drive that is synchronized with the DME. The problem with this solution is that having motors and drive shaft in a Soft CP would introduce hard electro-mechanical structures that will damage the test vehicle upon impact. Further, those structures may become damaged themselves during impact, reducing the robustness of the GST.

Figure 5A:
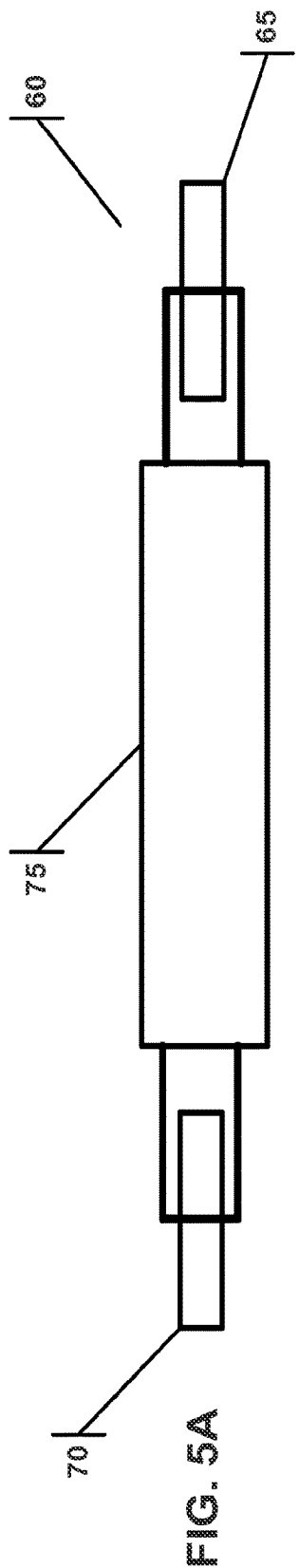
FIG. 5A illustrates a top view of a conventional motorcycle driving in a straight line.
Figure 5B:
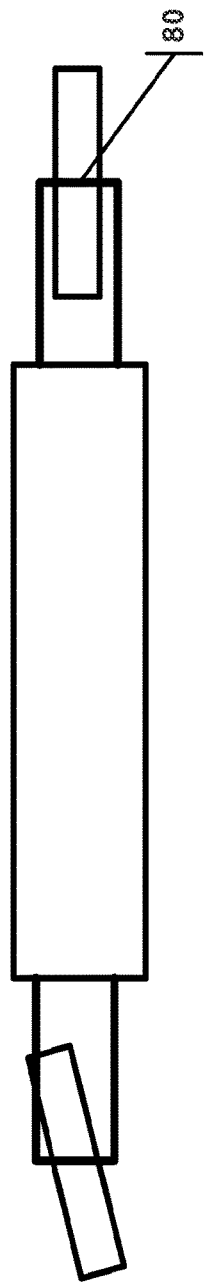
FIG. 5B illustrates a top view of a conventional motorcycle turning to the left.
Figure 5C:
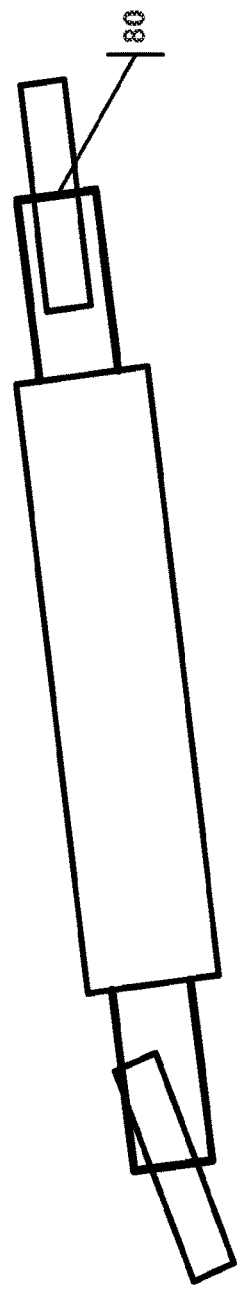
FIG. 5C illustrates the turning point axis of a conventional motorcycle.

Another option to emulate realistic wheel rotation is to allow the wheels of the Soft CP to contact the ground, and thus rotate at the appropriate speed. This solution, too, has several problems. For example, referencing FIGS. 5A through 5C, a conventional motorcycle 60 is shown from a top view. FIG. 5A is the motorcycle 60 traveling in a straight line, while in FIG. 5B the front wheel 70 is turning left, causing the motorcycle 60 to rotate about the turning pivot axis 80 located at the rear wheel 65 contact with the ground. This is shown in FIG. 5C, where the motorcycle 60, including the motorcycle frame 75, is rotating about the turning pivot axis 80.

FIG. 6A illustrates a GST with a soft motorcycle CP 10. Underneath the soft frame 20 is a DME 15, and it is the DME 15 that controls steering. This is disclosed in the patent applications incorporated above by reference. A salient difference between a conventional motorcycle 60 (FIGS. 5A-5C) and a GST with a soft motorcycle CP 10 is the location of the turning pivot axis. The DME 15 may have a steering front wheel 92 and separately powered drive wheels 94. In such a configuration, the soft motorcycle CP turning pivot axis 95 is located along the axis of the DME drive wheels 94. This means that when the DME turns, the soft motorcycle rear and front wheels (85, 90) must slide laterally across the ground, encountering a friction force 100. This force prevents the DME from smoothly turning, which impairs the realistic movement that the GST is attempting to emulate. Further, if the Soft CP frame and wheel mounting forks are made of a soft pliable material, the friction force 100 will cause the frame and forks to twist, potentially damaging the soft motorcycle CP and, again, reducing the realistic movement of the GST.

To overcome this problem, the front and rear wheel mounting forks, as well as the frame for the soft motorcycle can be made rigid. However, this is counterproductive, because using rigid and hard frame and forks would damage the test vehicle upon impact.

FIG. 1 presents a wheel system that solves these problems. A GST with a soft motorcycle CP 10 is shown. The GST may also be in the shape of a bicycle. A soft frame 20 is mounted on a DME 15. Extending from the soft frame 20 are two soft wheel mounting forks 25 that support an axle 27 that is substantially perpendicular to the soft frame longitudinal axis 22. The axle supports a tire body 30 and a ground-contacting tire ridge 35. The DME 15 may be connected to an antennae 45 to communicate with a base station and/or to receive other data, including but not limited to, GPS location data. A tension cable 40 extends from the soft frame 20 to the soft wheel mounting fork 25. Importantly, only the ground-contacting tire ridge 35 contacts the ground 50. The ground-contacting tire ridge 35 may be of a width that is less than 25% of the width of the tire body 30 (see FIG. 3B, width 32), and may extend from the tire body by ⅛ to 2 inches. Also, the material of the ground-contacting tire ridge 35 may be selected (and may be different than the tire body 30) to allow it to slide laterally with minimal resistance such that it minimizes movement or inclination about the soft frame longitudinal axis. Such movement or inclination could damage the soft motorcycle CP and may also appear unrealistic, undermining the efficacy of the vehicle testing. Thus, the material and width are selected to permit lateral sliding of the ground-contacting tire ridge 35 when the DME is in motion.

Figure 2:
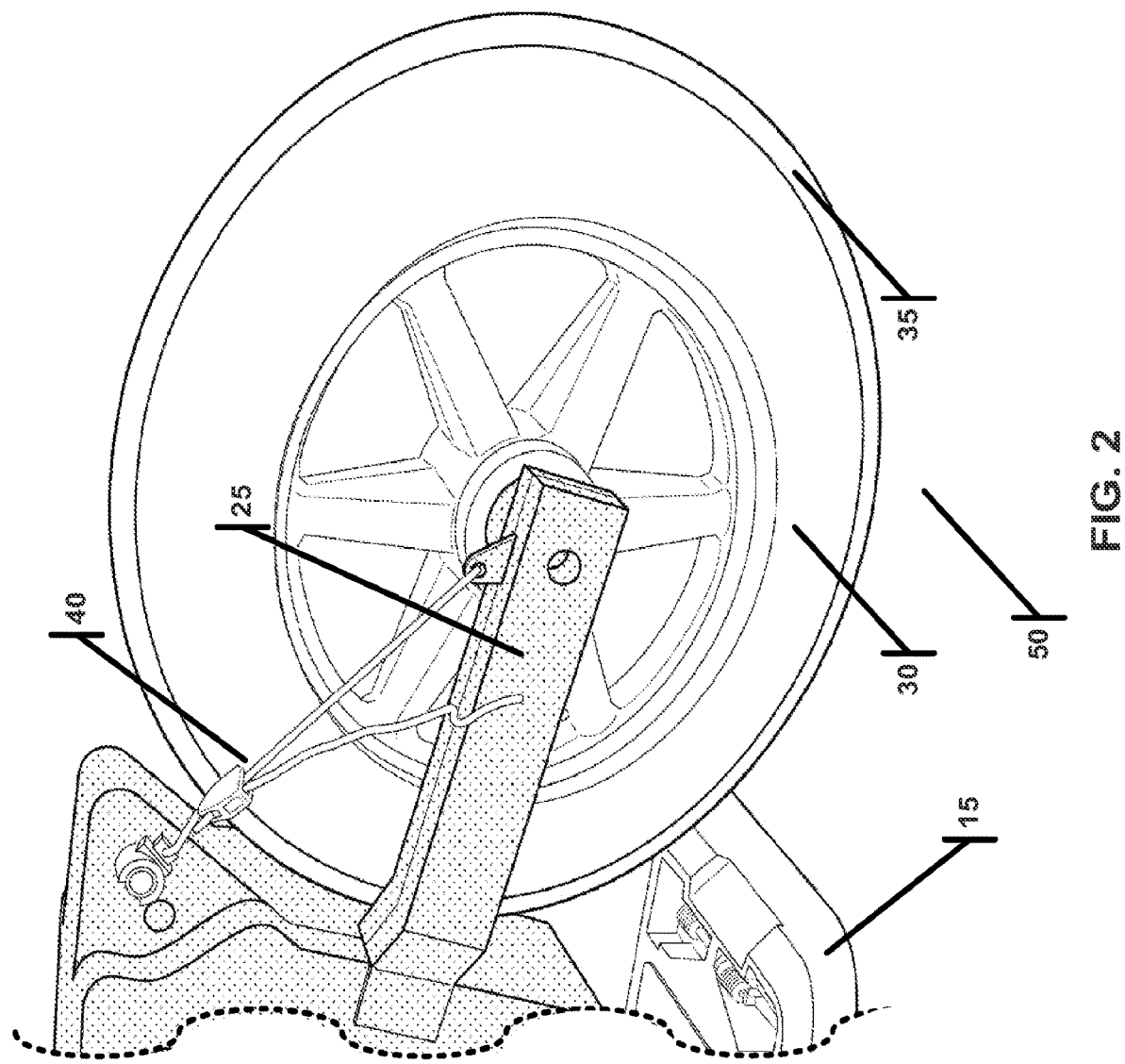
FIG. 2 is a photograph of the tire portion of the Soft Motorcycle Target of FIG. 1.

FIG. 2 is a detailed view of the rear wheel assembly, showing the ground-contacting tire ridge 35 that extends from the tire body 30. The tire body 30 is of a realistic size, such that the tire looks realistic to the ACAT. FIG. 3A is a diagram showing the tire body 30 that is circumscribed by the ground-contacting tire ridge 35. FIGS. 3B and 3C are cross-sectional views.

Figure 4:
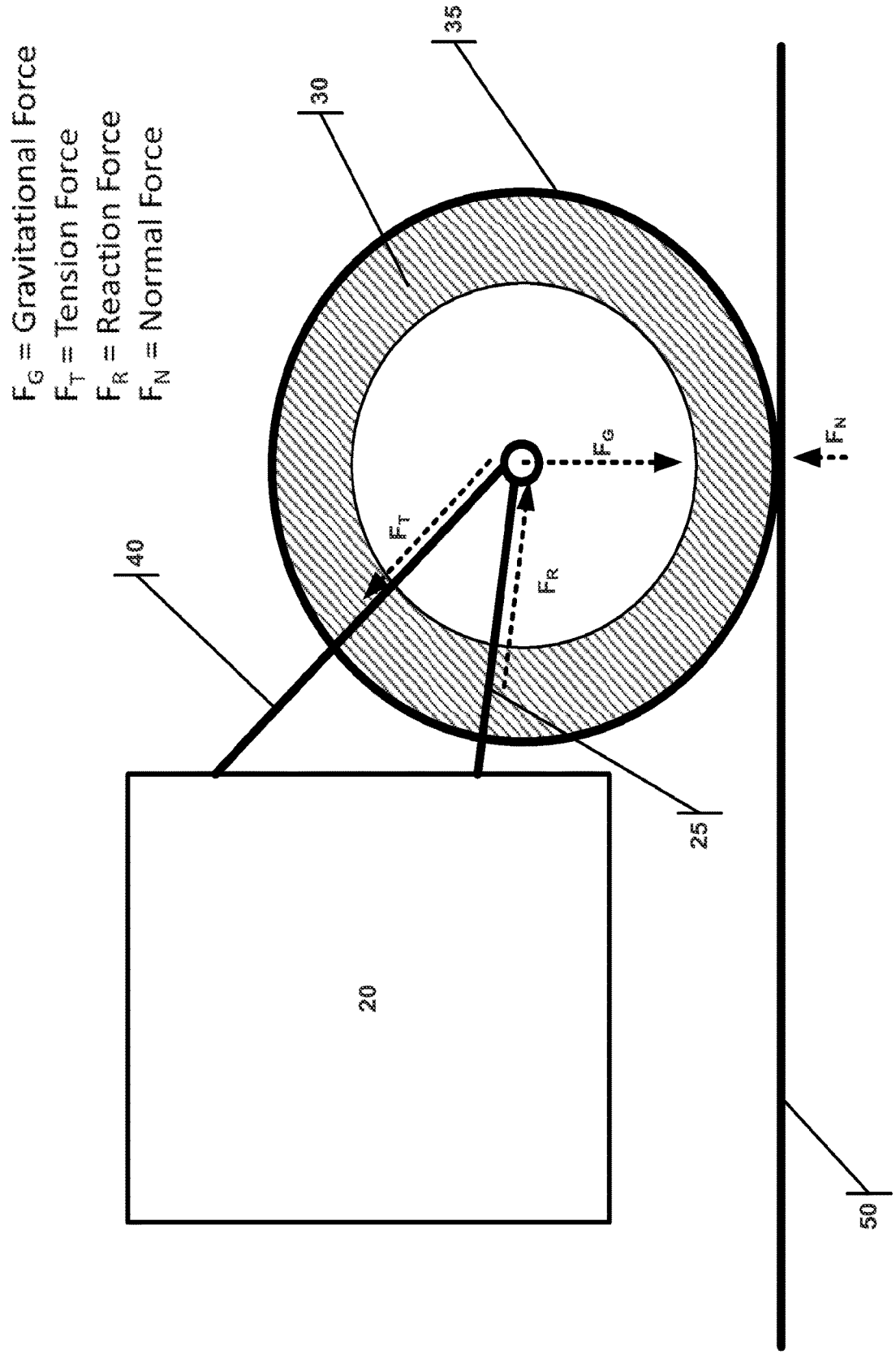
FIG. 4 is a force diagram.

By providing a narrow ground-contacting tire ridge 35 that is in contact with the ground 50, the lateral frictional forces that are discussed above with reference to FIGS. 6A and 6B are minimized. Further, the tension cable 40 (FIGS. 1 and 2) supports much of the weight of the wheel, such that the wheel weight against the ground is reduced, which also minimizes the lateral frictional forces. FIG. 4 illustrates the various forces.

The tension cable 40 also reduces wheel bouncing. Specifically, because the wheel supporting forks are made of a soft compliant material, when the wheel encounters a bump in the road, the wheel jumps up, bending the wheel support fork. Given the compliance of the fork material, the wheel then begins to bounce. This, again, is not a realistic-looking action, and can result in less-than-optimal testing conditions for the ACAT. The tension cable 40 provides a lower limit to the position of the wheel, and thereby mitigates bouncing.

Figure 8:
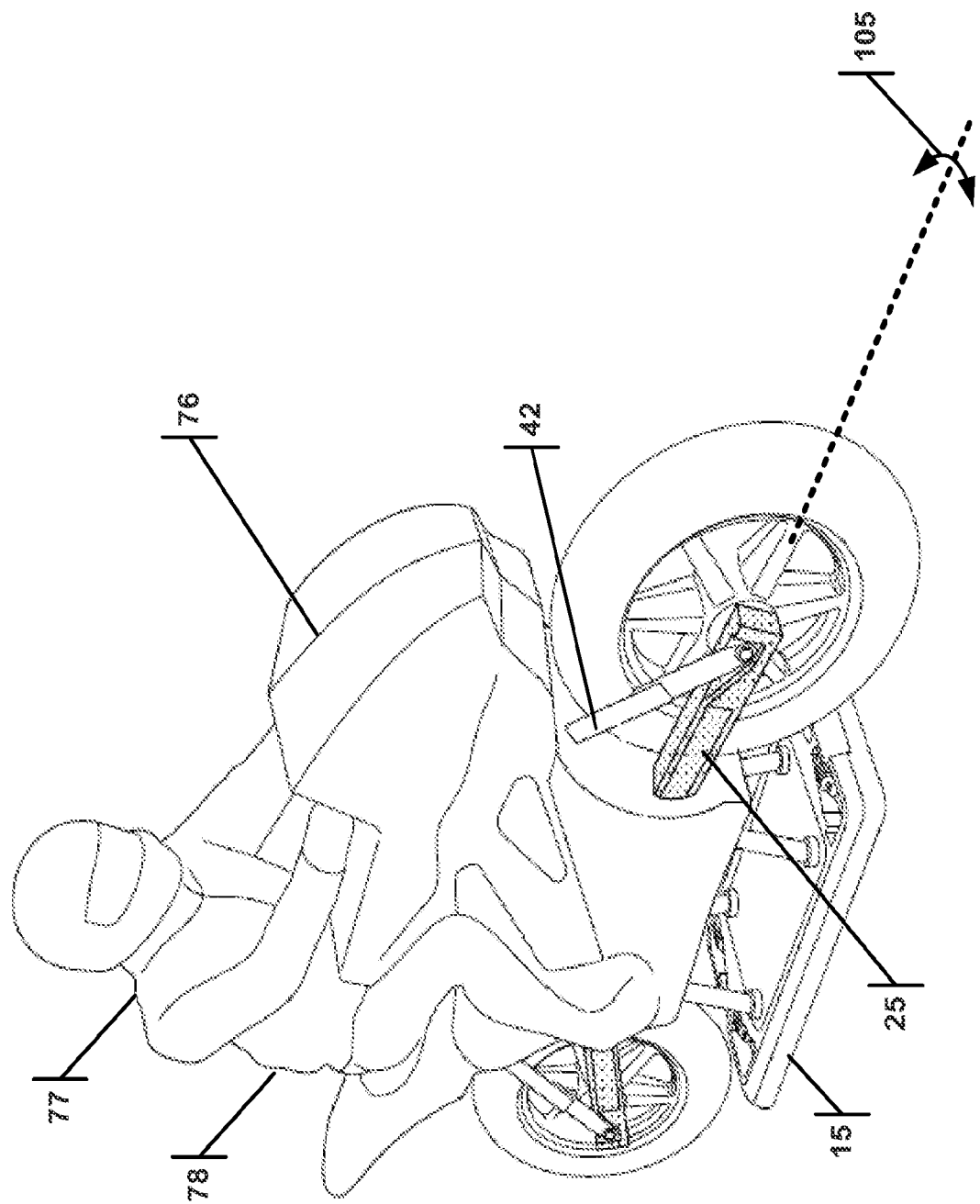
FIG. 8 illustrates a Soft Motorcycle Target, complete with a motorcycle shell and rider.

FIGS. 7 and 8 illustrate the soft motorcycle target, complete with a motorcycle shell 76 and a rider 77. The soft motorcycle target is given its shape by using closed-cell Ethylene-Vinyl Acetate (EVA) copolymer foam. The EVA material is shaped using vacuum forming to give it a shape that is very similar to a real motorcycle including both the overall size and also specific features and components. The rider 77 can additionally have a fabric covering 78 that may add protection and realism. Using a closed-cell, higher density material with a shape similar to a real motorcycle results in radar characteristics that more closely match that of a real motorcycle. Additionally, the EVA material has the following properties, which make it an optimal material for a surrogate target that will be used outdoors and which needs to be able to not be damaged during impacts with another vehicle.

High durability and sturdiness, even at extremely low temperatures
Ability to withstand stress without obtaining cracks or breaking
UV-resistant properties
Water-resistant attributes
Resilience even after long-term use
Ability to withstand compression and recuperate Existing Soft CPs are typically constructed using lightweight open-cell polyethylene foam. This foam is lightweight and soft but easily damaged. Small tears will propagate with minimal external force, and contact with a rough test surface (such as asphalt or concrete) will abrade the foam very quickly. The prior art mitigates these issues by applying a durable fabric cover over the fragile foam.

When being used for a target, the materials disclosed herein provide several features that are not found in any existing target construction methods. For example, EVA material can be thermoformed into the realistic shape of the target. The EVA material, with a durometer of between 50 and 90 Shore A is sufficiently rigid to maintain its shape but is also sufficiently compliant to be struck by a test vehicle without causing damage to the test vehicle or to the Soft CP. The EVA material, with an Abrasion Resistance Index (as defined by ASTM D1630) above 20, is also sufficiently resistant to damage via contact with the test surface. Finally, because the Soft CP foam is resilient and durable, an outer protective covering is not necessary, although it may nevertheless be used. The EVA soft body may approximate the three-dimensional shape and size of a vehicle, including but not limited to a car, motorcycle, or bicycle. It may also approximate a pedestrian.

FIGS. 7 and 8 also illustrate a tension ribbon 42 that provides a tension force to the soft wheel-mounting forks 25 as well as some compressive force. Thus, these vertical wheel supports can be made of tension-only materials (e.g., string/cables, see FIGS. 1 and 2) as well as materials that can provide tension and compression (e.g. plastic ribbons, see FIGS. 7 and 8). Both types of materials can support the weight of the wheel, which limits the force between the wheel and the ground. The tension-only (string/cables) embodiment may be sufficient for operating at relatively low speeds or when the ground surface is very smooth. At high speeds or due to ground surface variation, the wheel may experience laterally forces at the ground contact patch, which could cause the wheel to lean to the left or to the right relative to the direction of travel, resulting in torsional forces (shown as the multi-directional arrow 105, FIGS. 7 and 8) on the soft wheel-mounting forks 25. Using plastic tension ribbons 42 as the vertical supports adds additional stiffness to prevent torsion and minimizes torsional forces by providing some compressive force when the wheel begins to lean.

Figure 9A:
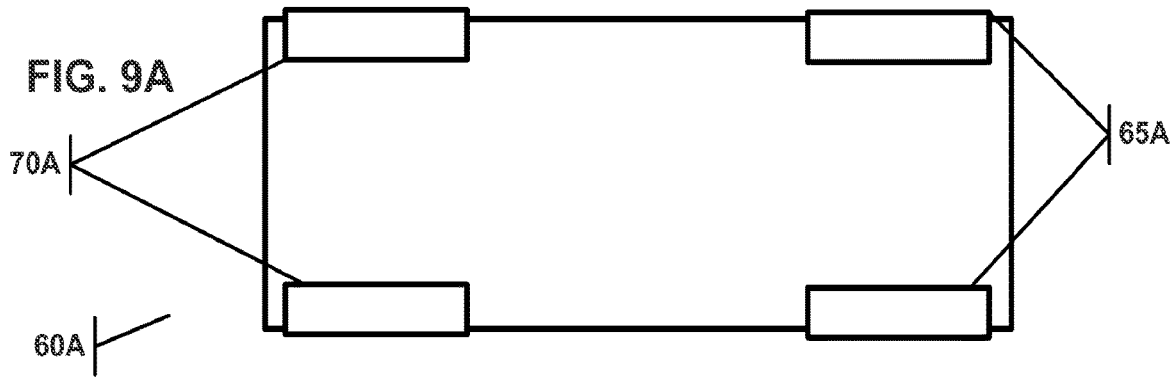
FIG. 9A illustrates a top view of a conventional car driving in a straight line.
Figure 9B:
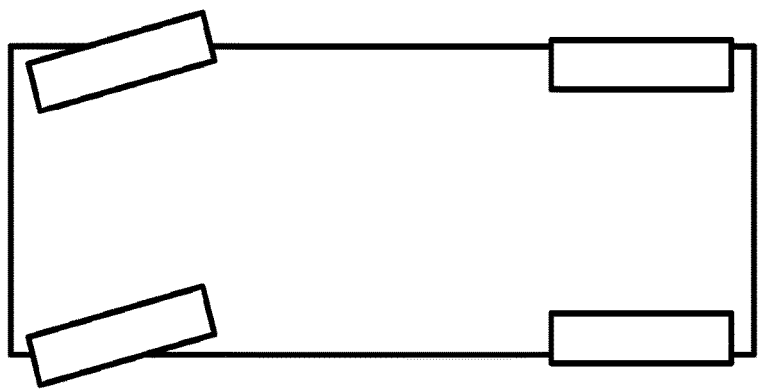
FIG. 9B illustrates a top view of a conventional car turning to the left.
Figure 9C:
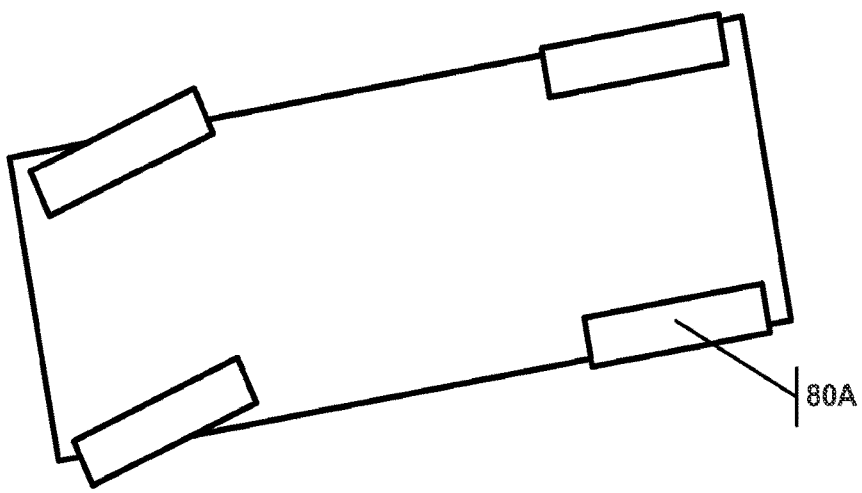
FIG. 9C illustrates the turning point axis of a conventional car.

The same tire with a ground-contacting tire ridge may be used with a soft car CP. FIGS. 9A-9C illustrate a conventional car 60A with front wheels 70A for steering and rear wheels 65A. As the front wheels 70A turn (FIG. 9B), the car 60A will pivot about the automobile turning pivot axis 80A, as shown in FIG. 9C.

Figure 10A:
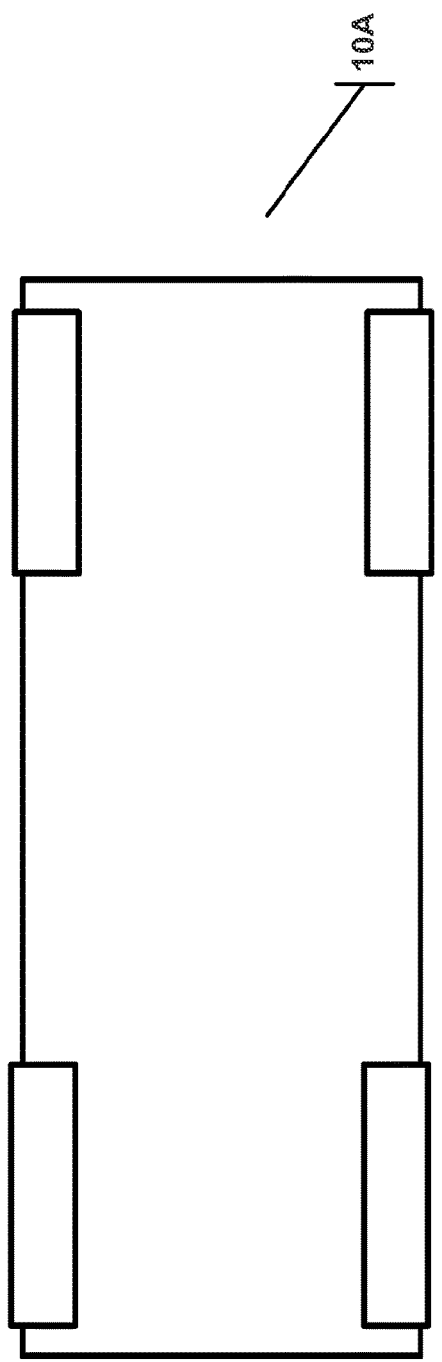
FIG. 10A illustrates a top view of a soft car target driving in a straight line.
Figure 10B:
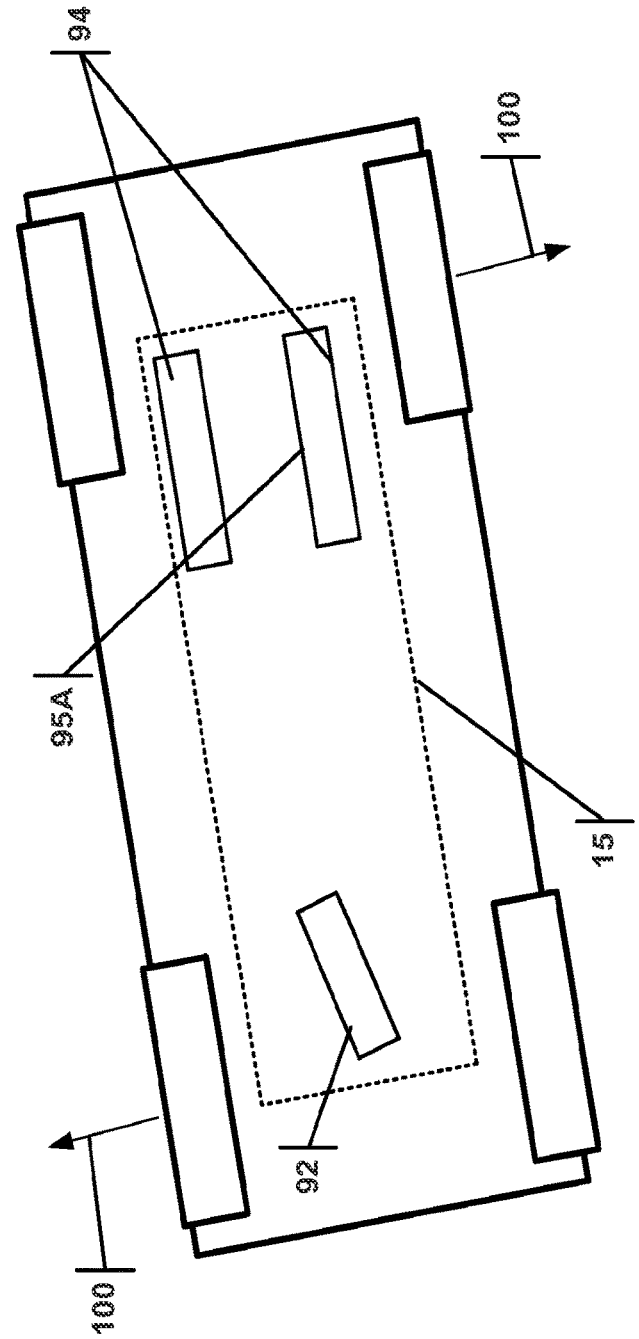
FIG. 10B illustrates the turning point axis of a soft car target, along with the lateral friction forces against the wheels of the soft car target.

FIG. 10A illustrates a GST with soft car CP 10A. Underneath the soft frame is a DME and it is the DME that controls steering. This is disclosed in the patent applications incorporated above by reference. A salient difference between a conventional car 60A (FIGS. 9A-9C) and a GST with soft car CP 10A is the turning pivot axis location. The DME 15 may have a steering front wheel 92 and separately powered drive wheels 94. In such a configuration, the soft car CP turning pivot axis 95A is located along the axis of the DME drive wheels 94. This means that when the DME turns, the soft car rear and front wheels must slide laterally across the ground, encountering a friction force 100. This force prevents the DME from smoothly turning, which impairs the realistic movement that the GST is attempting to emulate. Using the tire with a ground-contacting tire ridge described above can mitigate these issues.

Figure 11A:
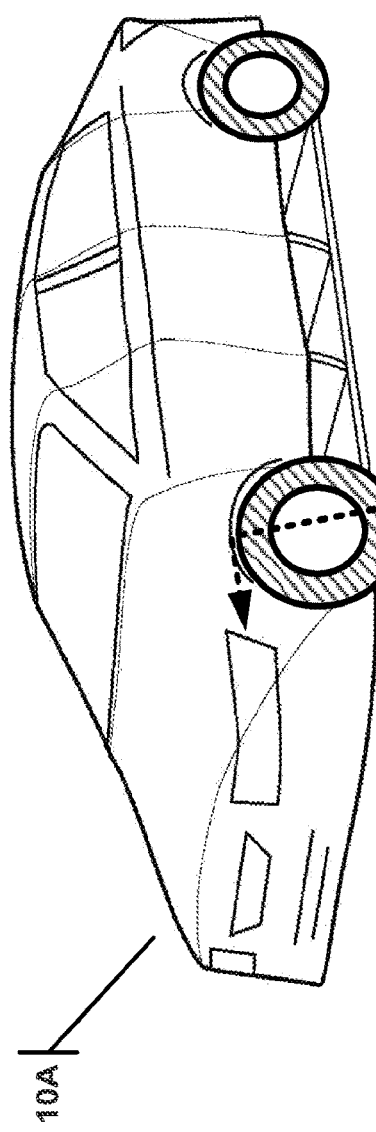
FIG. 11A illustrates a front perspective view of a Soft Car Target with wheels having a tire body and a ground-contacting tire ridge.
Figure 11B:
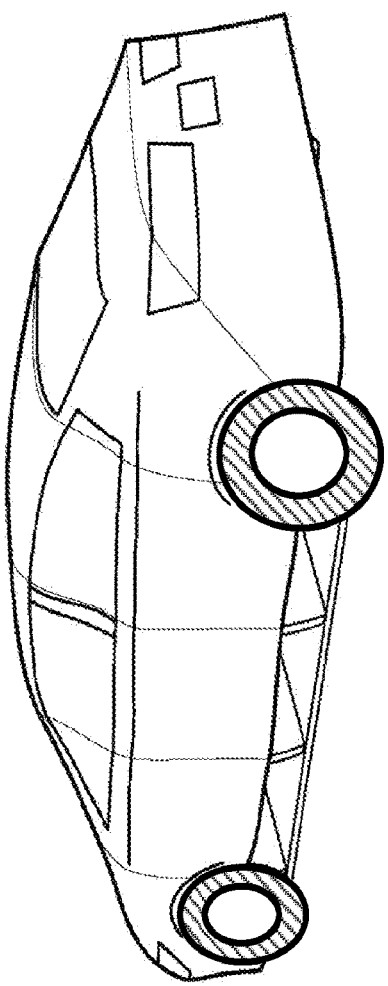
FIG. 11B illustrates a rear perspective view of a Soft Car Target with wheels having a tire body and a ground-contacting tire ridge.
Figure 11C:
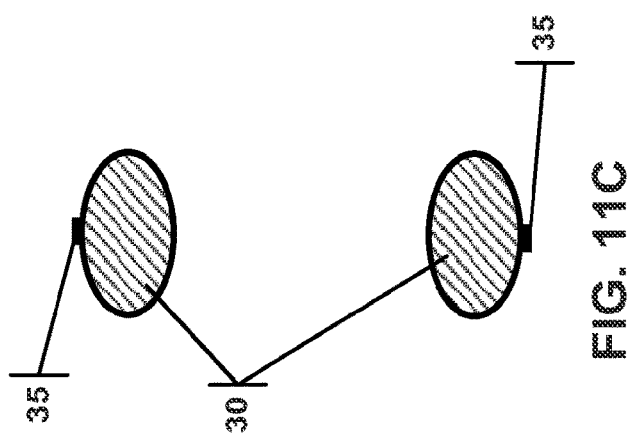
FIG. 11C is the cross-section taken along the cross-section of FIG. 11A.
Figure 12:
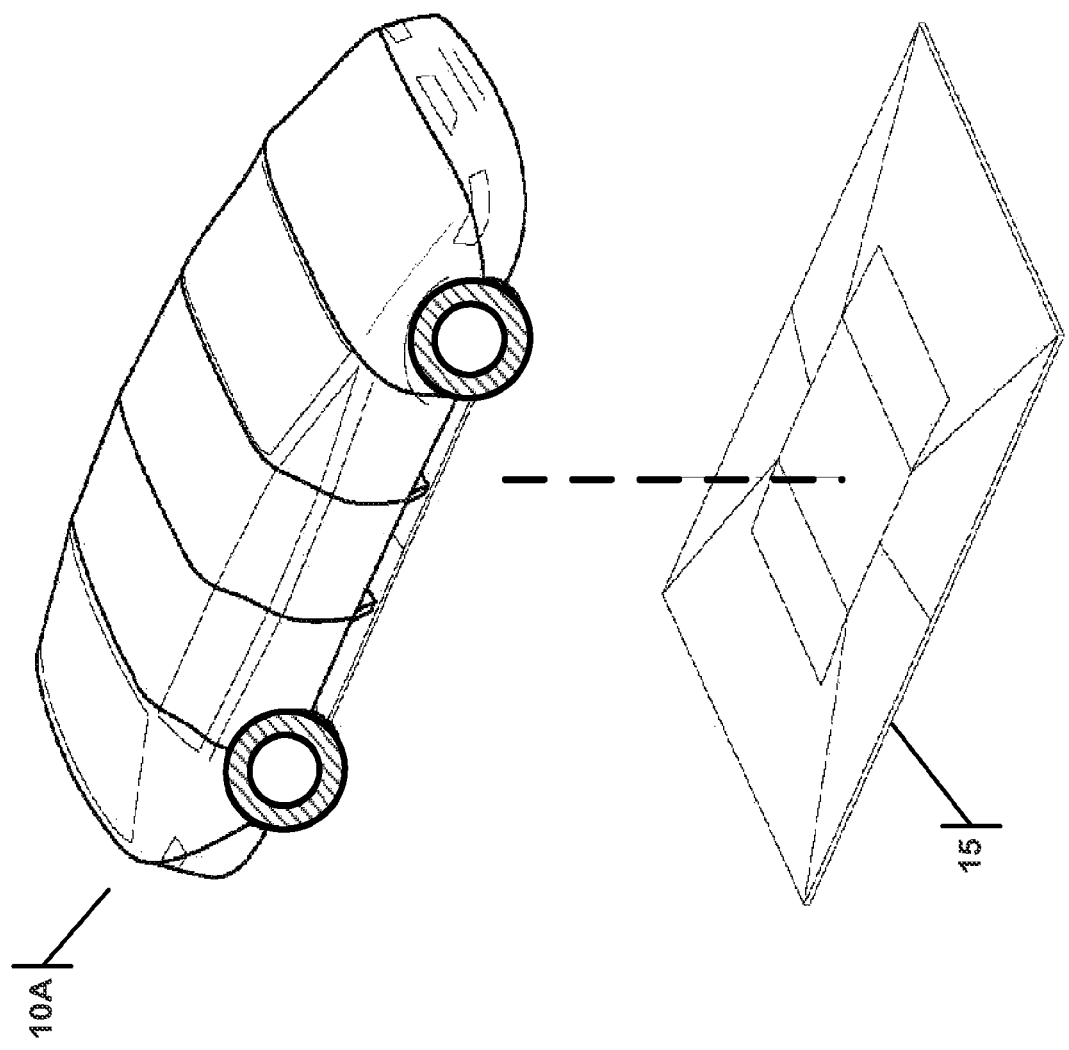
FIG. 12 illustrates a Soft Car Target with wheels having a tire body and a ground-contacting tire ridge, being mounted to a dynamic motion element (DME).

FIGS. 11A, 11B and 11C illustrate a front perspective view of a Soft Car Target 10A with wheels having a tire body 30 and a ground-contacting tire ridge 35. When the Soft Car Target 10A is mounted to a DME 15, the ground-contacting tire ridge 35 will cause the wheels to turn, better simulating a realistic vehicle for testing. FIG. 12 illustrates a Soft Car Target 10 being mounted to a dynamic DME 15.

Here are the materials in a preferred embodiment:
a. the tire body 30 is comprised of EVA material with an approximate durometer of 70 A;
b. the ground-contacting tire ridge 35 is made of an EPDM (Ethylene Propylene Diene Monomer) rubber that is ⅛ inch thick, and extends ¾ inch from the tire body;
c. the wheel support forks 25 and soft frame 20 are comprised of polyethylene foam (2.2 lb/ft$^3$) material, with nylon strips to reinforce the foam in both tension and compression that are ⅛ inch thick.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently-preferred embodiment of the invention and are therefore representative of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

The invention claimed is:

1. A system for testing vehicle crash avoidance technologies in a subject vehicle, the system comprising:
a dynamic motion element (DME);
a guided soft target (GST), the GST comprising:
a soft body removably attachable to the DME such that the soft body detaches from the DME when the GST collides with a subject vehicle;
an axle connected to the soft body positioned substantially perpendicular to a soft body longitudinal axis;
a tire body rotatably connected to the axle comprising an outer surface concentric with the axle and encircling the axle;
a ground-contacting tire ridge extending from and encircling the outer surface, and constructed to contact the ground when the soft body is attached to a DME;
wherein the ridge is comprised of a ridge material and has a ridge width, and wherein the ridge material and ridge width are selected to (1) permit the tire body to slide in a direction parallel to the axle while minimizing movement or inclination of the tire body about the soft body longitudinal axis, and (2) rotate the tire body about the axle as the DME moves.

2. The wheel system of claim 1, where the soft body is a soft car.

3. The wheel system of claim 1, where the soft body is a bicycle.

4. The wheel system of claim 1, wherein the tire body comprises a tire width as measured parallel to the ground, and wherein the ridge width is less than 25% of the tire width.

5. The wheel system of claim 1, wherein the ground-contacting tire ridge extends from the portion of the outer surface in the range of ⅛ inch to 2 inches.

6. The wheel system of claim 1, wherein the tire body is comprised of a tire body material that is different from the ridge material.

7. The wheel system of claim 1, wherein the tire body material is ethylene-vinyl acetate copolymer foam.

8. The wheel system of claim 1, where the soft body is a soft motorcycle.

9. The system of claim 8, further comprising:
a fork extending from the soft body, the axle connected to the fork; and
a strap or cable connected to the fork on one end and to the soft body on the other end, wherein the strap or cable provides a tension force that counteracts a portion of the gravitational force experienced by the tire body when the soft body is attached to a DME.

10. The wheel system of claim 9, wherein the strap or cable is constructed to mitigate bouncing of the wheel when the DME moves.

11. A system for testing vehicle crash avoidance technologies in a subject vehicle, the system comprising:
a dynamic motion element (DME); and
a guided soft target (GST), the GST comprising:
a soft body removably attachable to the DME such that the soft body detaches from the DME when the GST collides with a subject vehicle,
a fork extending from the soft body;
an axle connected to the fork;
a tire body rotatably connected to the axle comprising an outer surface concentric with the axle and encircling the axle;
a ground-contacting tire ridge extending from and encircling the outer surface, and constructed to contact the ground when the soft body is attached to a DME; and
a strap or cable connected to the fork on one end and to the soft body on the other end, wherein the strap or cable provides a tension force that counteracts a portion of the gravitational force experienced by the tire body when the soft body is attached to a DME.

12. The wheel system of claim 11, where the soft body is a soft motorcycle.

13. The wheel system of claim 11, wherein the ridge is comprised of a ridge material and has a ridge width, and wherein the ridge material and ridge width are selected to permit the tire body to slide in a direction parallel to the axle when the tire body is subjected to a lateral force.

14. The wheel system of claim 11, wherein the strap or cable is constructed to mitigate bouncing of the wheel when the DME moves.

15. The wheel system of claim 11, wherein the tire body comprises a tire width as measured parallel to the ground, and the ground-contacting tire ridge comprises a ridge width that is less than 25% of the tire width.

16. The wheel system of claim 11, wherein the ground-contacting tire ridge extends from the outer surface in the range of ⅛ inch to 2 inches.

17. The wheel system of claim 11, wherein the tire body is comprised of a material that is different from the ridge material.

18. The wheel system of claim 11, wherein the tire body material is ethylene-vinyl acetate copolymer foam.

19. A soft body adapted to form the body of a Guided Soft Target for testing crash avoidance technologies in a subject vehicle, wherein the soft body is adapted to be mounted atop a motorized Dynamic Motion Element (DME) and, when so mounted, is adapted to collide with the subject vehicle while the DME is moving, the soft body comprising:
a body comprised of closed-cell Ethylene-Vinyl Acetate (EVA) copolymer foam with a durometer of between 50 and 90 Shore A and an abrasion resistance index greater than 20;
a mounting surface formed into the body, the mounting surface constructed to detachably mount the soft body to the DME; and
a wheel system comprising:
an axle connected to the body positioned substantially perpendicular to a body longitudinal axis; and
a tire body rotatably connected to the axle;
wherein the tire body is constructed to contact the ground when the body is mounted to a DME, and the tire body rotates about the axle as the DME moves; and
wherein the tire body comprises an outer surface concentric with the axle and encircling the axle, and wherein the tire body comprising a ground-contacting tire ridge extending from and encircling the outer surface, and wherein the tire ridge contacts the ground when the soft body is attached to a DME.

* * * * *